Figure 9:
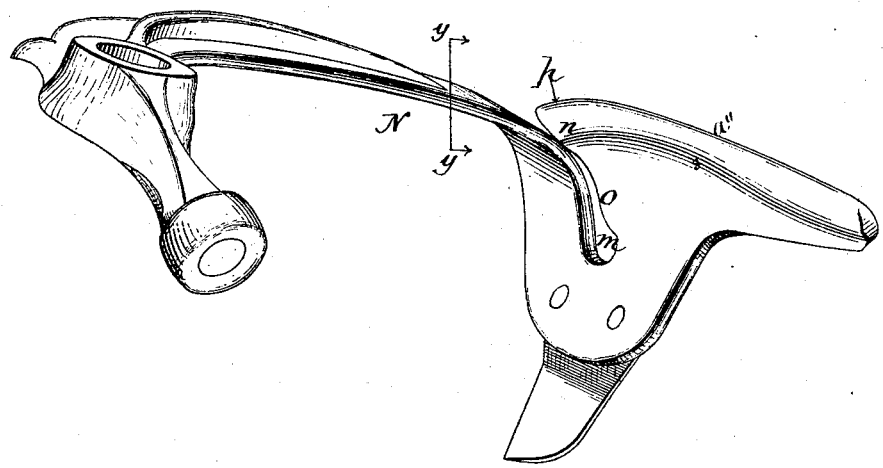

(No Model.)  5 Sheets—Sheet 1.
G. ESTERLY.
GRAIN HARVESTING AND BINDING MACHINE.
No. 282,065. Patented July 31, 1883.
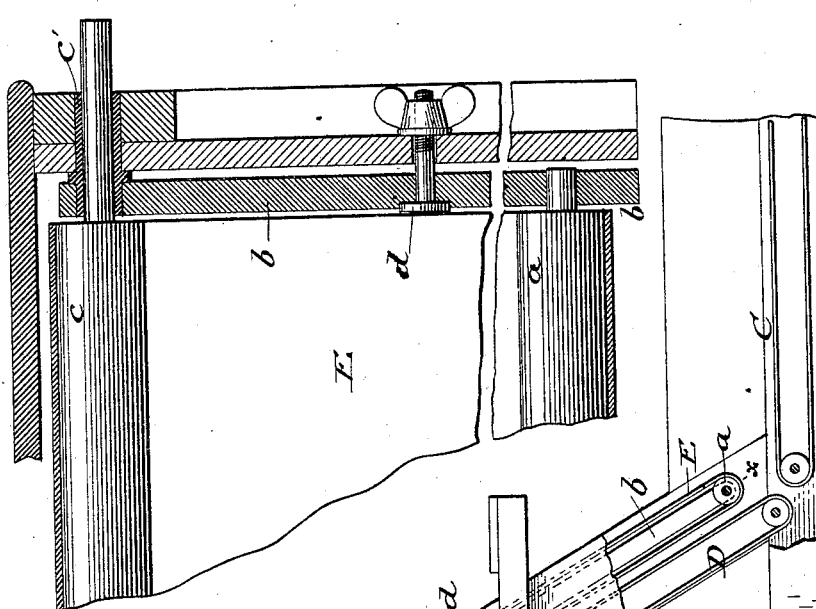
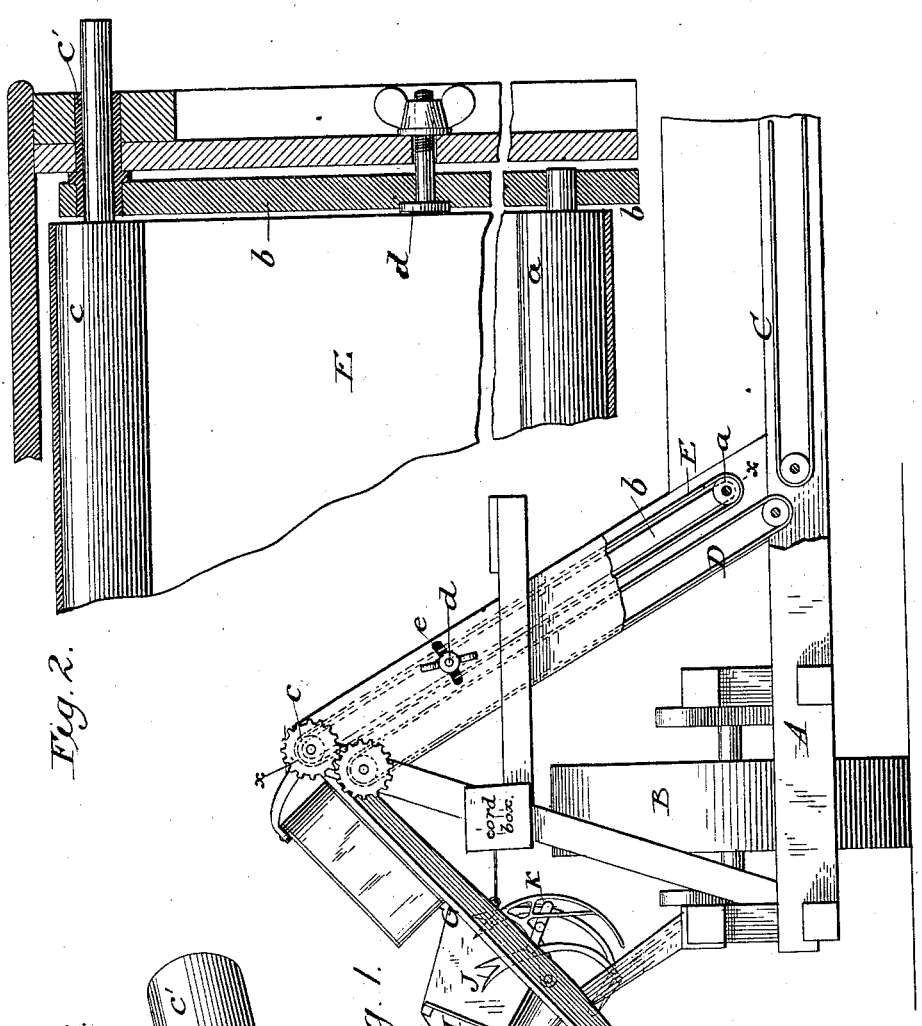
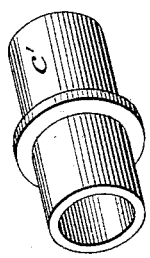
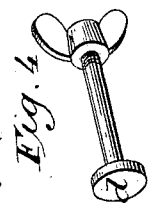
Attest.
Sidney P. Hollingsworth
Newton Wyckoff.
Inventor.
George Esterly
By Philip T. Dodge
Attorney.
N. PETERS, Photo-Lithographer, Washington, D. C.

(No Model.) 5 Sheets—Sheet 2.
G. ESTERLY.
GRAIN HARVESTING AND BINDING MACHINE.
No. 282,065. Patented July 31, 1883.
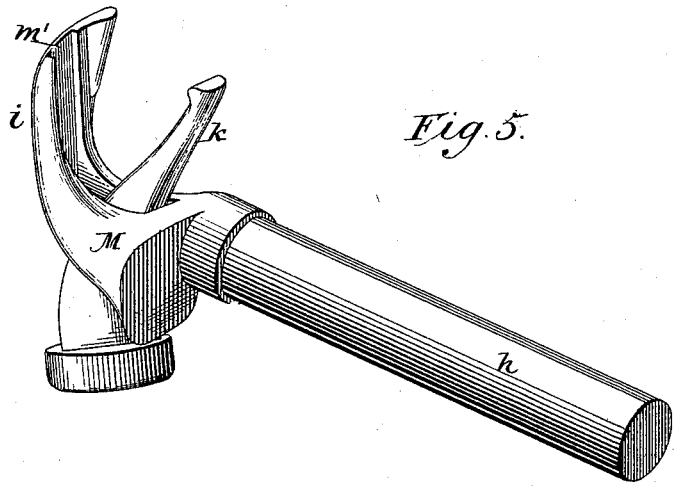
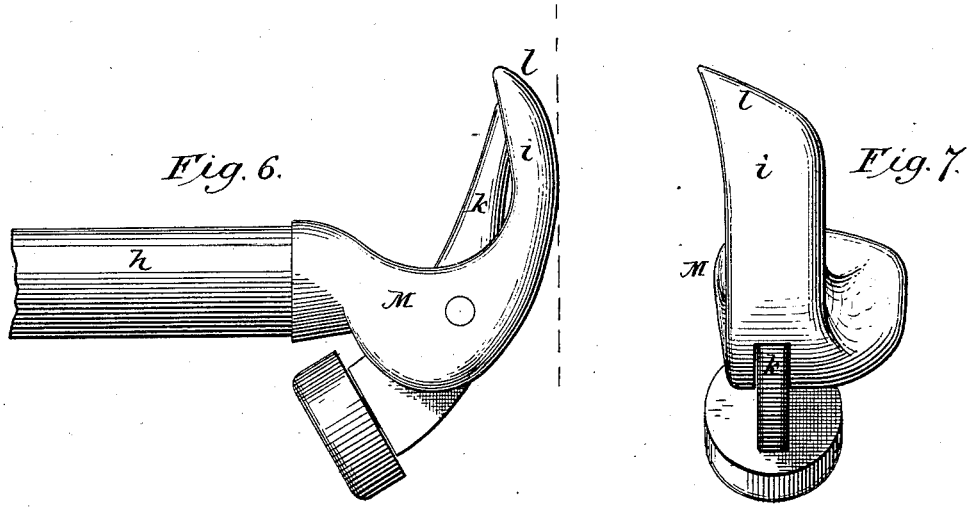
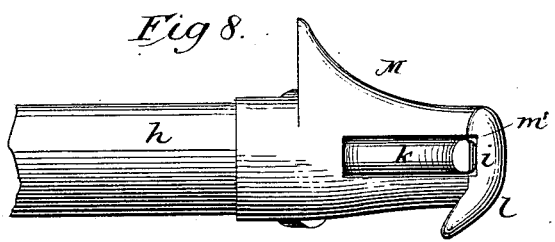
Attest:
Sidney P. Hollingsworth
Newton Wyckoff
Inventor:
George Esterly
By his Attorney
Philip T. Dodge (No Model.) 5 Sheets—Sheet 3.

G. ESTERLY.
GRAIN HARVESTING AND BINDING MACHINE.

No. 282,065. Patented July 31, 1883.

Attest.
Sidney P. Hollingsworth
Newton Wyckoff.

Inventor.
George Esterly.
By his Attorney
Philip T. Dodge (No Model.) 5 Sheets—Sheet 4.

G. ESTERLY.
GRAIN HARVESTING AND BINDING MACHINE.

No. 282,065. Patented July 31, 1883.

Attest.
Sidney P. Hollingsworth
Newton Wyckoff

Inventor:
George Esterly.
By his Attorney
Philip T. Dodge.

(No Model.) 5 Sheets—Sheet 5.

G. ESTERLY.
GRAIN HARVESTING AND BINDING MACHINE.

No. 282,065. Patented July 31, 1883.

Attest.
Sidney P. Hollingsworth
Harry Shipley

Inventor.
George Esterly.
By his Attorney
Philip T. Dodge.

UNITED STATES PATENT OFFICE.

GEORGE ESTERLY, OF WHITEWATER, WISCONSIN.

GRAIN HARVESTING AND BINDING MACHINE.

SPECIFICATION forming part of Letters Patent No. 282,065, dated July 31, 1883.

Application filed October 30, 1882. (No model.)

*To all whom it may concern:*

Be it known that I, GEORGE ESTERLY, of Whitewater, in the State of Wisconsin, have invented certain Improvements in Machines for Harvesting and Binding Grain, of which the following is a specification.

My invention relates to that class of grain-binding machines wherein the grain is elevated between two endless aprons over the main wheel and delivered to an automatic mechanism which binds each bundle with cord.

The invention relates, first, to an improved manner of suspending the upper elevator-apron which rests on top of the ascending grain, whereby the attendant is enabled to so adjust said apron as to act with a variable yielding pressure or by gravity, as may be required. This improvement is designed particularly with a view to the delivery of the grain in proper condition for the action of the band-applying mechanism, and may therefore be properly considered a part of the binding-machine.

The second feature of the invention relates to the cord-tying devices; and it consists in the peculiar construction and arrangement of the tying-bill and cord-guiding arm, as hereinafter explained, whereby the tyer is enabled to grasp and tie the cord with certainty and without the assistance of the cord depressing or tucking arm hitherto commonly employed.

As certain of my improvements are most advantageously used in connection with that type of machine commonly known as the "Appleby," represented in Letters Patent No. 212,420, granted to Appleby, and in Letters Patent granted to me, No. 266,254, I have in the accompanying drawings shown them embodied in a machine the leading elements of which are similar to those shown in said patents.

Figure 10:
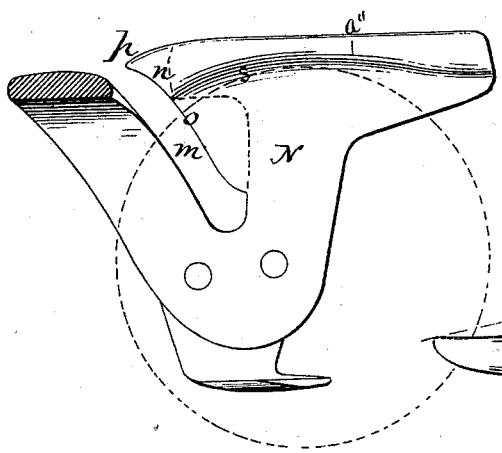
Figure 11:
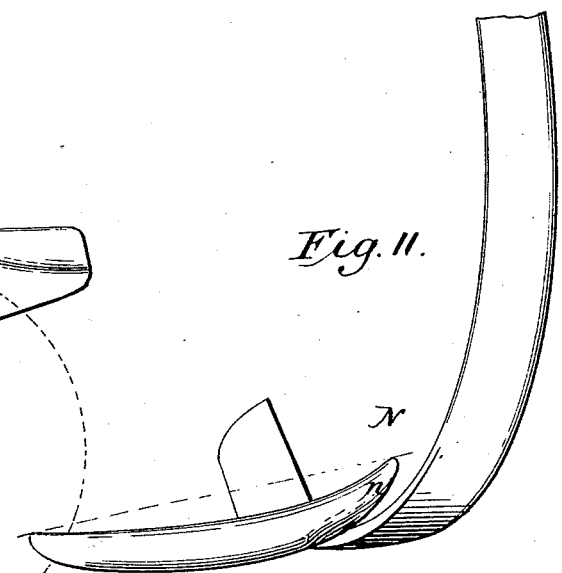
Figure 12:
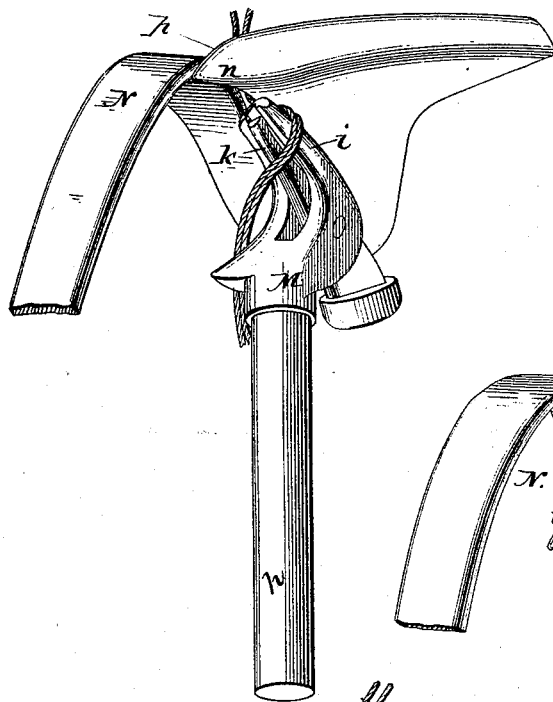
Figure 13:
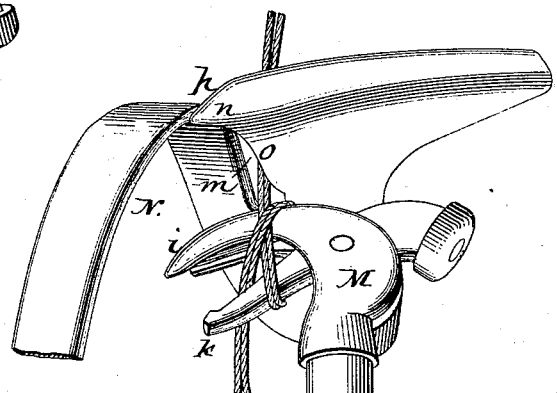
Figure 14:
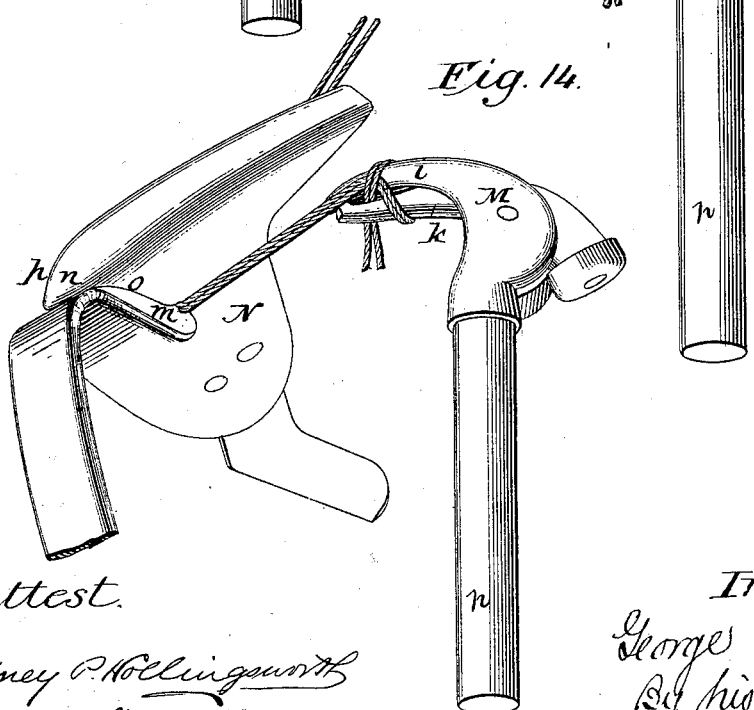
Figure 16:
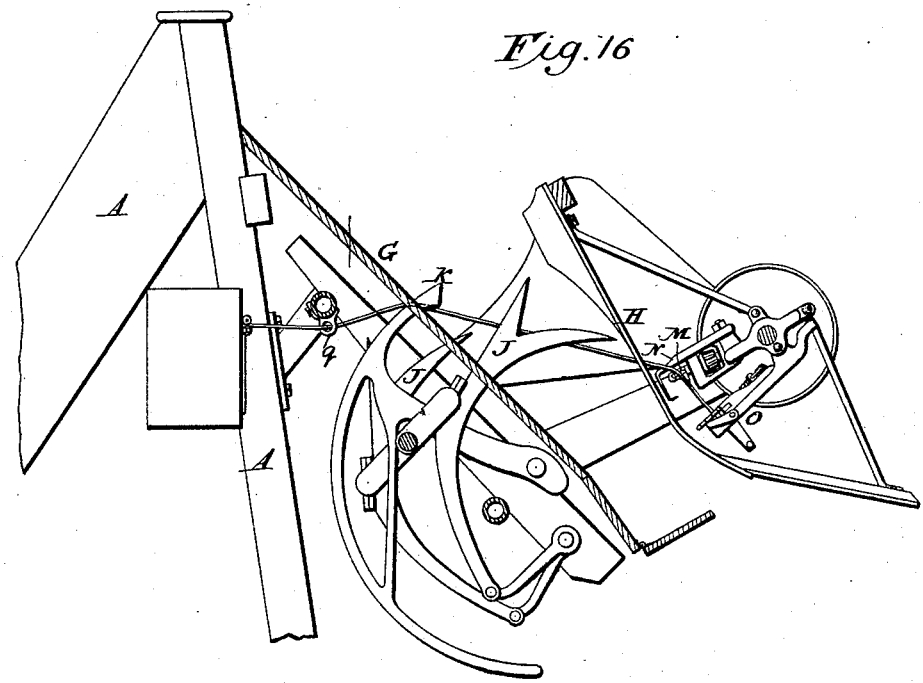
Figure 17:
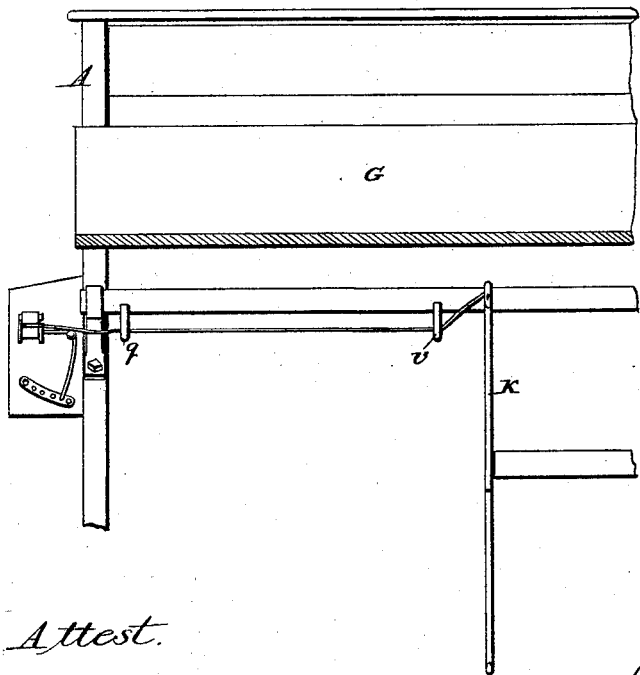
Figure 15:
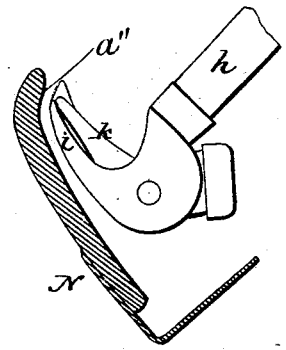

Referring to the accompanying drawings, Figure 1 represents a rear elevation of the main frame of the harvester with the elevator and binder thereon, the lower end of the elevator being shown in section. Fig. 2 represents a section through one side of the elevator on the line $x\,x$. Figs. 3 and 4 are perspective views of the sleeve for suspending the elevator and the screw for fastening the same. Fig. 5 is a perspective view of the tyer. Figs. 6 and 7 are respectively a side and an end view of the same. Fig. 8 is a view looking against the ends of the tying-fingers. Fig. 9 is a perspective view of the cord-guiding and knife-carrying arm, which may be made without the knife, if desired. Fig. 10 is a cross-section of the same on the line $y\,y$, Fig. 9, looking in the direction indicated by the arrow. Fig. 11 is a top view of the arm. Figs. 12, 13, and 14 are views illustrating the action of the tyer and guide-arm on the cord. Fig. 15 is a vertical section through the cord-guiding arm on the line $z\,z$ of Fig. 10, the tyer being also shown in position. Figs. 16 and 17 are vertical sections through the binding-table and adjacent parts, illustrating the manner in which the cord is passed to the tying mechanism without the employment of the usual take-up devices.

Referring to the drawings, A represents the main frame of the harvester; B, the main wheel; C, the horizontal conveyer-apron by which the grain falling backward from the cutting mechanism is delivered to the elevators; D E, the two inclined aprons by and between which the grain is elevated and delivered over the main wheel, all of which parts are of ordinary construction and arrangement except in the particulars hereinafter specified.

Each elevator-apron is carried by two rolls at opposite ends. The rolls of the lower apron, D, are mounted on fixed bearings, as usual; but the roll $a$ at the lower end of the top apron has its journals mounted in the lower ends of two swinging sustaining arms or bars, $b$, which have their upper ends mounted around the journals of the roll $c$, which carries the upper end of the apron. It will be seen that by thus sustaining the lower roll in pendent supports it is permitted to rise and fall with the lower end of the apron and vary the space for the admission of grain between the two aprons.

Under certain conditions which arise in practice it is advantageous to leave the pendent arms free, so that the lower end of the apron will act by gravity alone upon the top of the grain. In ordinary constructions, however, it is best to have the lower end of the apron urged downward with an elastic or spring pressure on top of the ascending grain. For this purpose I provide means for securing the upper ends of the roll-sustaining arms $b$, and make said arms of wood or other elastic material, and of such size that they can yield under the pressure of the grain beneath the apron, thus allowing the lower end of the apron E to accommodate itself to the varying quantity of grain received thereunder.

The fastening device consists of a bolt, d, passed outward through each arm b and through a slot, e, in the side of the stationary frame, and provided with a tightening-nut on the outer end. This device permits the position of the spring-arms to be adjusted as desired, so that they will hold the lower end of the apron normally at a greater or less distance from the bottom apron. Instead of the slot in the frame, a series of holes may be used to permit the adjustment, and in place of the bolt any equivalent fastening device may be employed.

For the purpose of relieving the journal of the upper roll from the friction which would be produced by the weight of the arms b directly thereon, I make use of sleeves or thimbles, such as represented in Fig. 3, adapted to surround the journal of the roll and receive support at one end from the stationary frame, while at the opposite end they enter and serve as journals for the swinging arms. As a simple means of holding these sleeves in place against end motion, I provide them at the center with a flange or enlargement, either in the form shown or in any other suitable form. It will be perceived that the journal of the upper roll revolves within the sleeves, which serve as bearings for the same, while the arms b will revolve upon or with the sleeves independently of the journal.

Passing now to the mechanism by which the binding of the grain is effected, it will be found similar in general arrangement and mode of action to those shown in the patents before mentioned.

G represents the grain receiving or binding table; H, the stationary slotted breast-plate, between which and the table the grain is compressed and bound; I, the gavel-sustaining and tripping arm; J J, the packer-arms, by which the grain is compressed into gavels; K, the binder-arm or needle, arranged to swing upward through the table, and carry the cord around the gavel and through the breast-plate to the tying and retaining devices; L, the rotary bundle-discharging arm; M, the rotary tyer or knotter, located above the breast-plate; and N, the vibratory cord-guiding and knife-carrying arm, having its operative end located between the tyer and the place occupied by the gavel, to assist the needle-arm in laying the ends of the applied band or cord in proper position across the fingers of the tying-head. This vibratory arm, unlike that in the Appleby Patent No. 212,420, also serves by its lateral motion, after the completion of the knot, to extend the cord endwise from the tying-fingers in a position substantially at right angles to the axis of the tyer, so that the knot will be stripped from the tyer by the outward movement of the bundle under the action of the ejector-arms thereon. This peculiar movement of the cord-guiding arm is effected by a cam-wheel acting upon its rear end. So far as the purposes and objects of the present invention are concerned, this peculiar movement of the cord-guiding arm is of no moment, since the peculiarities of action in presenting the cord to the tyer, resulting from the present invention, may be secured, whether the arm operate to extend the cord from the tyer, as last specified, or be operated to strip the knot, as in the Patents Nos. 212,420 and 266,254, before alluded to. The peculiar arrangement of the mechanism by which the arm is caused to extend the cord from the ends of the fingers, after the formation of the knot, is not claimed herein, but will be made the subject of a separate application for patent.

The tyer employed is of that class sometimes denominated "tying-bills," in which two narrow fingers, one movable to and from the other, are applied to one end of a revolving spindle, at right angles, or thereabout, to its axis, so that when rotated against the cord they first twist the same into a loop, and then grasp the end and draw it through the loop to complete the knot. Tyers of this class as heretofore constructed—illustrated, for example, in the patent to Behel, No. 41,661, and Appleby, No. 208,137—have been made with the tying fingers or bills straight or substantially straight, so that when revolved against the cord lying across them they tended to crowd the same away without forming the loop therein. This necessitated the use of a guiding-arm to present the cord across the fingers, and also a second arm known as a "cord depressor" or "tucker," to keep the cord down in the path of the fingers, so that it would be wound around them instead of sliding, as it has a tendency to do, over their ends. The form and arrangement of these devices, well understood by those skilled in the art, are plainly represented in Patent No 266,254, granted to me October 17, 1882.

The aim of my improved tying devices is to adapt them to engage the cord with certainty without the assistance of the depressor or tucker, which is dispensed with.

To this end it consists in the combination of a tyer formed in the peculiar manner described, with the cord guiding or placing arm also constructed in a peculiar manner, whereby it is caused to present the cord to the bills of the tyer in such manner that it cannot escape therefrom.

Referring to Figs. 5, 6, 7, 8, 12, 13, 14, and 15, h represents the spindle of the tyer; i, the outer tying-finger, formed rigidly thereon, extending at substantially right angles to its axis; and k, the inner pivoted finger, which will be opened and closed by cams or springs, as usual. The inner finger is straight, or substantially so, as usual; but the outer finger, i, is extended or lengthened beyond the end of the pivoted finger, and has its extremity curved forward in the direction in which it revolves when looping the cord. The outer end of the finger $i$ is preferably beveled or rounded away on the rear side, as shown at $l$, Fig. 7. In addition to its forward curvature in the path of rotation, the end of the finger $i$ is also curved somewhat in a plane lying in the direction of the axis of the spindle, or, in other words, in a direction at right angles to the plane of rotation. This curvature is plainly represented in Fig. 6, in which the dotted line indicates a plane lying at right angles to the axis. In its inner face the finger $i$ is usually grooved, as shown at $m'$, Fig. 5, to permit the cord to be clamped the more securely therein by means of the movable finger.

Passing next to the cord-guiding arm N, it will be seen to resemble in general form and arrangement the one shown in my Patent No. 266,254. It is arranged, as in said patent and in the Appleby Patent No. 212,420, so that its notched or slotted end vibrates closely past the end of the tyer, for the purpose of assisting the needle-arm to place the cord within the reach of the tyer and to effect or assist in effecting the stripping of the knot from the tyer. Its operative end is provided with a slot, $m$, which receives the cord as the latter is laid in place by the binder-arm, causing the same to ride to one side in reach of the tying-fingers. The extremity of the arm is made in a T form, as represented in my Patent No. 266,254, but differs therefrom in the form of the edge beneath which the cord passes, as will be hereinafter specified. In the former machine the slot in the arm was in such form that it did not hold the cord down properly within the reach of the tying-fingers, for which reason the tucking-finger before alluded to was employed to effect the depression of the cord. In order to adapt the guiding-arm to hold the cord within reach of the tying-fingers without assistance, I now construct the same in the peculiar form represented in Figs. 9 to 15. As shown more especially in Fig. 10, the end is of the form approximating that of the letter T, with one horn, $n$, overhanging the slot $m$, as in the previous patent. Instead of cutting away this overhanging horn on the under side, as in the former device, I now extend the inner lower edge of the horn, which forms the upper edge of the slot $m$, downward and laterally, as shown at $o$, Fig. 10, the dotted lines in said figure indicating substantially the original shape. This laterally-curved edge $o$ is of such size and form as to crowd and hold the cord down within reach of the tying-fingers. It will be observed that to this end the edge $o$ is curved downward below the path described by the extremity of the hooked tying-finger, which path is indicated by dotted lines in Fig. 10. In order that the cord may be caught with certainty under the overhanging horn $n$, the latter is made of greater length than in the original patent, or, in other words, extended a greater distance above the slot $m$, and is beveled or rounded away on its upper side, as shown at $p$, Fig. 10, permitting the cord laid thereon by the needle-arm to slide into the slot and under the horn.

The finger of the tyer revolves, as shown in Figs. 12, 13, and 14, in close proximity to the arm. The instant that the cord passes into the slot $m$ it rides beneath the horn $n$ against the edge $o$, by which it is caused to ride downward within reach of the tying-fingers, and as the fingers rotate, the cord riding downward against the edge $o$ is caused to wind closely around them at their inner ends. In practice it is found that the forwardly-curved hook, combined with the edge $o$ of the guide, located in the position described, renders the clasping and holding of the cord a matter of certainty.

As in my previous patent, No. 266,254, the upper edge, $a''$, of the arm N is curled inward at the top toward and above the tyer, as shown in Fig. 15, to insure the passage of the cord behind the tying-fingers. This feature, although a desirable one, is not a necessity. Instead of having the overhanging edge $a''$ straight on the inner or vertical face, as heretofore, I now give it a longitudinal curvature, as shown in Fig. 11, in which the departure from the straight dotted line is clearly apparent. This curvature should conform substantially to the arc of a circle described from the axis about which the arm vibrates, or, in other words, to the curved path of vibration, the object being to cause the edge of the arm to remain in close proximity to the tyer during its movement. I also prefer to give the overhanging edge $a''$ of the arm a curvature on the under side corresponding approximately with the path in which the ends of the tying-fingers revolve. This curvature it plainly represented at $s$, Fig. 10, in which it will be seen that the under surface of the overhanging edge or lip follows substantially the dotted lines indicating the path of the tying-finger. This peculiar curvature is, however, a feature of minor importance.

Passing next to the manner of delivering the binding-cord to the tying mechanism, it is passed from the supply-box, with or without the use of a frictional tension device, through stationary guides $q$ and $v$, thence through the point of the needle-arm, and through the slot in the breast-plate, over the guide-arm, to the clamping device O, which is mounted on a swinging plate, so as to yield the cord to the tyer during the formation of the knot, as usual. The machine is made without the usual devices for taking up and for slackening the cord.

Having thus described my invention, what I claim is—

1. In a harvesting-machine, the roll carrying the lower end of the elevator-apron, combined with pendent elastic arms sustaining the journals of said roll, and means, substantially as described, for adjusting and rigidly securing said arms at a point distant from their lower ends, whereby said arms are caused to serve the twofold purpose of sustaining the roll and applying a yielding pressure to the apron.

2. In an automatic harvester and binder, the combination, with the elevator-frame, of the upper elevator-roll, the lower elevator-roll, the pendent arms $b$, and the sleeves encircling the journals of the upper roll and forming a bearing therefor in the frame, and also for sustaining the arms $b$, as shown.

3. In an automatic harvesting and binding machine, the roll at the upper end of the elevator, the roll at the lower end of the elevator, and the pendent elastic arms $b$, combined with the slotted supporting-frame, and the clamping bolts uniting the frame and arms, substantially as shown, whereby the pendent arms are adapted to give an elastic support to the lower roll, and the adjustment of said roll permitted.

4. The cord-guiding arm having the notched T-shaped end, with the horn overhanging the notch, and the downwardly and laterally extended edge below the horn to guide and hold down the cord, as described.

5. In combination with the rotary tying-fingers, the vibratory cord guiding arm having the notched T-shaped end, with its upper edge curled inward over or above the fingers, and also curved longitudinally to conform substantially to its path of vibration.

6. The cord-guiding arm having the notched T-shaped end, its upper edge, $a''$, being curved inward above the path of the tying-fingers, said overhanging edge being curved on the under side to correspond substantially with the path of the tying-fingers, as represented at $s$.

7. In combination with the rotary tying-fingers, the vibratory cord-guiding arm having the cord-receiving notch $m$, the T-shaped end, with one horn overhanging said notch, and with the inclined surface on the upper side of said horn to direct the cord past its end into the notch, whereby the entrance of the cord beneath the horn and its confinement thereunder are insured.

8. In combination with the rotary tyer-fingers, the cord-guiding arm having the notched T-shaped end curved in horizontal direction, as shown.

9. The combination of the clamp to hold the end of the cord, the rotary tyer having the finger curved forward in the path of rotation, the vibratory cord-guiding arm constructed with the cord-receiving notch and depressed edge $o$, as described, and the needle-arm arranged to lay the cord across the guiding-arm and thence to the clamp.

10. In combination with a cord-guide having a notched T-shaped end arranged to vibrate past the end of the tyer in a direction substantially at right angles to the axis of said tyer, the rotary tyer having the finger curved forward in the direction of its rotation, whereby it is adapted to co-operate with the T-shaped end of the cord-guide to seize and retain the binding-cord.

GEORGE ESTERLY.

Witnesses:
J. H. PAGE,
EDWIN T. CASS.